No. 670,474. Patented Mar. 26, 1901.
J. B. ENTZ.
STORAGE BATTERY.
(Application filed July 9, 1900.)
(No Model.)
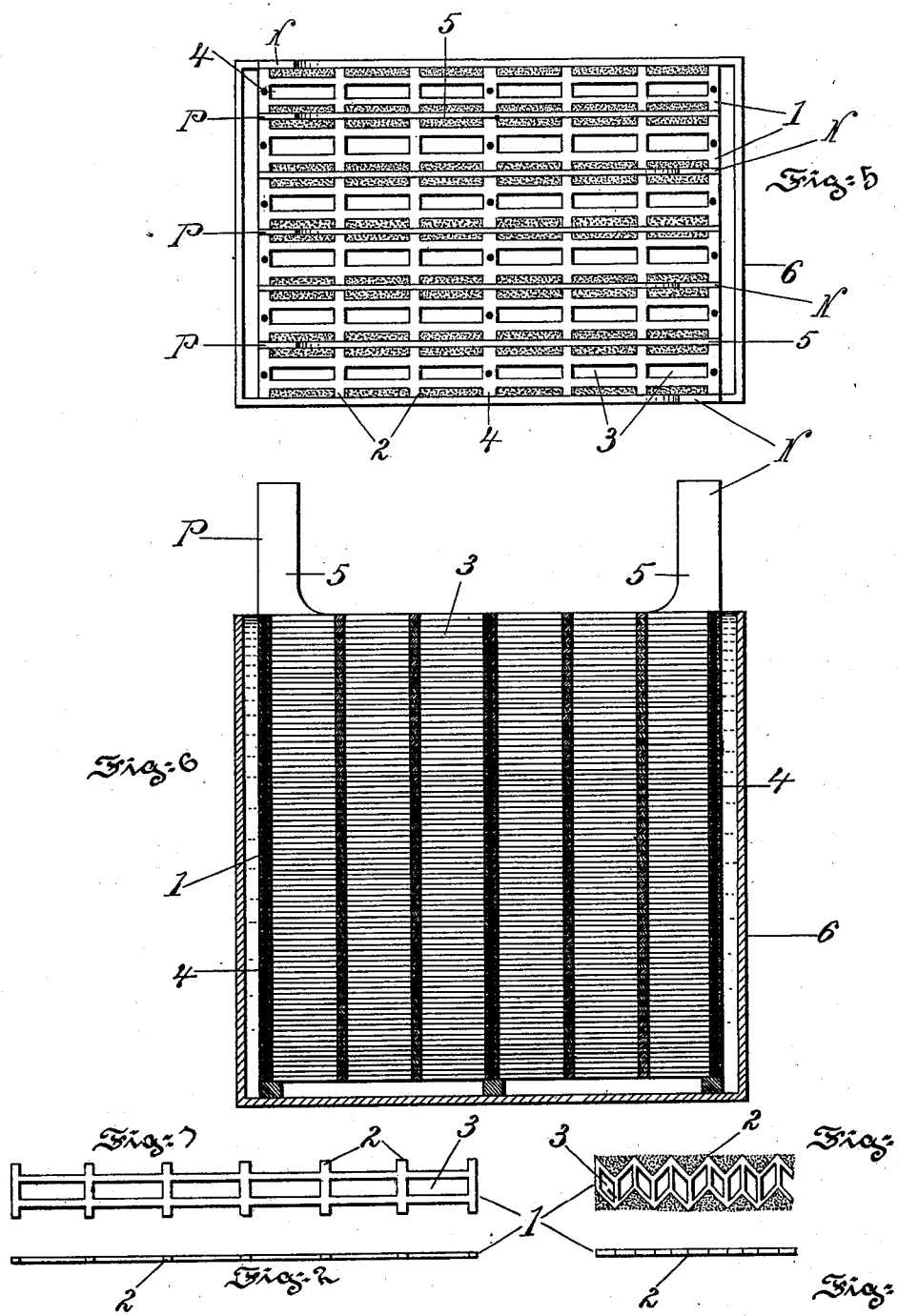

UNITED STATES PATENT OFFICE.

JUSTUS B. ENTZ, OF PHILADELPHIA, PENNSYLVANIA, ASSIGNOR TO THE ELECTRIC STORAGE BATTERY COMPANY, OF SAME PLACE.

STORAGE BATTERY.

SPECIFICATION forming part of Letters Patent No. 670,474, dated March 26, 1901.

Application filed July 9, 1900. Serial No. 23,061. (No model.)

*To all whom it may concern:*

Be it known that I, JUSTUS B. ENTZ, a citizen of the United States, and a resident of Philadelphia, in the county of Philadelphia and State of Pennsylvania, have invented a certain new and useful Improvement in Storage Batteries, of which the following is a specification.

One object of the present invention is to provide a battery in which the electrical capacity shall be large and in which the weight shall be comparatively small.

Another object of the present invention is to provide an inexpensive and mechanically strong battery in which the effective surface of active material is relatively large.

To these and other ends the invention comprises the improvements hereinafter described and claimed.

The nature, characteristic features, and scope of the invention will be more fully understood from the following description, taken in connection with the accompanying drawings, forming part hereof, and in which—

Figures 1 and 2 are respectively a plan and a side elevation of one of the pieces or strips which go to make up the combined separator and support of my invention. Figs. 3 and 4 are similar views of a modified form of the same, and Figs. 5 and 6 are respectively a plan and a vertical sectional view of a battery embodying features of the invention.

Referring to the drawings, and more particularly to Figs. 1 and 2 thereof, 1 is a sheet of light non-conducting material, as hard rubber, and it is provided with a number of projections 2 and with a number of openings 3 for purposes to be presently described. As shown in the modification, the openings 3 are of somewhat different form, as are also the face projections 2. A number of these sheets are piled up the one upon the other and constitute a combined separator and support. The projections 2 extend from the opposite faces of this separator-support and the openings 3 constitute, as it were, wells within it. The separator-support, since it is made up of these sheets 1, may be described as laminated, and the various sheets or laminations may be held to place as by bolts or rods 4 or other suitable clamping devices. The active material or material to become active is pasted or otherwise applied to the faces of the described separator-support and the projections 2 serve to hold it to place. The wells 3 receive the electrolyte, which is enabled to enter them by reason of the laminated construction which permits of capillary action. Between each of the pasted or coated separator-supports is placed a conducting-plate 5, and the conducting-plates and separator-supports are mounted in a suitable jar or tank 6. The active material upon one side of the separator-support may be made positive and the active material on the other side negative.

As shown in Fig. 5, the positive conductors 5 are designated P and the negative plates or supports are designated N, and, as shown in that figure, the outside negative conductor is continued around the sides and bottom to form the tank or jar.

It will be obvious to those skilled in the art to which the invention appertains that modifications may be made in details without departing from the spirit thereof. Hence I do not limit myself to the precise construction and arrangement of parts herein set forth and shown in the drawings; but,

Having thus described the nature and objects of my invention, what I claim as new, and desire to secure by Letters Patent, is—

1. A laminated combined separator and support provided internally with a series of openings constituting wells and externally upon its faces with a series of projections, substantially as described.

2. An electrode or plate consisting of a laminated combined separator and support internally provided with openings forming wells and externally provided with projections, active material or material adapted to become active applied to the faces of said separator-support, and conducting-plates applied to the active material or material to become active, substantially as described.

3. A combined separator and support consisting of a pile of sheets of non-conducting material of which each sheet is provided with projections and with internal openings, substantially as described.

JUSTUS B. ENTZ.

Witnesses:
W. J. JACKSON,
K. M. GILLIGAN.